United States Patent
Singh et al.

(10) Patent No.: US 8,718,221 B2
(45) Date of Patent: May 6, 2014

(54) METHOD OF TRANSFERRING HIGH LEVEL RADIOACTIVE MATERIALS, AND SYSTEM FOR THE SAME

(75) Inventors: Krishna P. Singh, Jupiter, FL (US); John D. Griffiths, Deptford, NJ (US)

(73) Assignee: Holtec International, Inc.

( * ) Notice: Subject to any disclaimer, the term of this patent is extended or adjusted under 35 U.S.C. 154(b) by 572 days.

(21) Appl. No.: 12/970,901

(22) Filed: Dec. 16, 2010

(65) Prior Publication Data

US 2011/0150164 A1 Jun. 23, 2011

Related U.S. Application Data

(60) Provisional application No. 61/286,905, filed on Dec. 16, 2009.

(51) Int. Cl.
*G21F 5/005* (2006.01)
*G21F 5/06* (2006.01)
*G21C 19/02* (2006.01)
*G21C 19/07* (2006.01)
*G21F 5/00* (2006.01)
*G21C 19/00* (2006.01)

(52) U.S. Cl.
USPC ..... 376/272; 376/260; 250/505.1; 250/506.1; 250/507.1; 588/1

(58) Field of Classification Search
USPC ......... 376/260, 272; 250/505.1, 506.1, 507.1; 588/1, 16
See application file for complete search history.

(56) References Cited

U.S. PATENT DOCUMENTS

| | | | | |
|---|---|---|---|---|
| 3,466,444 A | * | 9/1969 | Lusk | 250/506.1 |
| 3,573,462 A | * | 4/1971 | Wilkins et al. | 250/506.1 |
| 4,353,391 A | * | 10/1982 | Belmonte et al. | 250/506.1 |
| 4,377,509 A | * | 3/1983 | Haynes et al. | 376/272 |
| 4,508,969 A | * | 4/1985 | Janberg et al. | 250/506.1 |
| 4,622,203 A | | 11/1986 | Ellcock | |
| 4,673,814 A | * | 6/1987 | Schroeder et al. | 250/506.1 |
| 4,728,136 A | * | 3/1988 | Newhouse et al. | 376/272 |
| 4,756,852 A | * | 7/1988 | Temus | 376/260 |
| 4,836,975 A | * | 6/1989 | Guldner et al. | 376/272 |
| 5,265,133 A | | 11/1993 | Matthews | |
| 6,587,536 B1 | * | 7/2003 | Singh et al. | 376/272 |
| 6,625,246 B1 | | 9/2003 | Singh et al. | |
| 7,330,526 B2 | | 2/2008 | Singh | |

* cited by examiner

Primary Examiner — Bernarr Gregory
(74) Attorney, Agent, or Firm — The Belles Group, P.C.

(57) ABSTRACT

An apparatus and method for inter-unit transfer of spent nuclear fuel. In one aspect, the invention is a method of transferring high level radioactive waste comprising: a) loading high level radioactive waste into a water-filled cavity of a canister body having an open top end at a first location; b) coupling a lid to the canister body to enclose the open top end; c) removing a volume of water from the cavity so that a water level of the water within the cavity is above a top end of the high level radioactive waste and a space exists between the water level and a bottom surface of the lid; d) hermetically sealing the cavity; and e) transferring the canister to a second location, the water level remaining above the top end of the high level radioactive waste during the transfer.

30 Claims, 3 Drawing Sheets

METHOD OF TRANSFERRING HIGH LEVEL RADIOACTIVE MATERIALS, AND SYSTEM FOR THE SAME

CROSS-REFERENCE TO RELATED PATENT APPLICATIONS

The present application claims the benefit of U.S. Provisional Application Ser. No. 61/286,905, filed Dec. 16, 2009, the entirety of which is hereby incorporated by reference.

FIELD OF THE INVENTION

The present invention relates generally to the field of transferring high level radioactive materials, and specifically to a canister apparatus and method for transferring high level radioactive materials in a submerged state.

BACKGROUND OF THE INVENTION

In the operation of nuclear reactors, the nuclear energy source is in the form of hollow zircaloy tubes filled with enriched uranium, typically referred to as fuel assemblies. When the energy in the fuel assembly has been depleted to a certain level, the assembly is removed from the nuclear reactor. At this time, fuel assemblies, also known as spent nuclear fuel, emit both considerable heat and extremely dangerous neutron and gamma photons (i.e., neutron and gamma radiation). Thus, great caution must be taken when the fuel assemblies are handled, transported, packaged and stored.

After the depleted fuel assemblies are removed from the reactor, they are placed in a canister. Because water is an excellent radiation absorber, the canisters are typically submerged under water in a pool. The pool water also serves to cool the spent fuel assemblies. When fully loaded with spent nuclear fuel, a canister weighs approximately 45 tons. The canisters must then be removed from the pool because it is ideal to store spent nuclear fuel in a dry state.

Removal from the storage pool and transport of the loaded canister to the storage cask is facilitated by a transfer cask. In facilities utilizing transfer casks to transport loaded canisters, an empty canister is placed into the cavity of an open transfer cask. The canister and transfer cask are then submerged in the storage pool. As each assembly of spent nuclear fuel is depleted, it is removed from the reactor and lowered into the storage pool and placed in the submerged canister (which is within the transfer cask). The loaded canister is then fitted with its lid, enclosing the spent nuclear fuel and water from the pool within. The canister and transfer cask are then removed from the pool by a crane and set down in a staging area to prepare the spent nuclear fuel for storage in the "dry state." Once in the staging area, the water contained in the canister is pumped out of the canister. This is called dewatering. Once dewatered, the spent nuclear fuel is dried using a suitable process such as vacuum drying. Once dry, the canister is back-filled with an inert gas such as helium. The canister is then sealed and the canister and the transfer cask are once again lifted by the plant's crane and transported to an open storage cask. The transfer cask is then placed atop the storage cask and the canister is lowered into the storage cask.

Because a transfer cask must be lifted and handled by a plant's crane (or other equipment), transfer casks are designed to be a smaller and lighter than storage casks. A transfer cask must be small enough to fit in a storage pool and light enough so that, when it is loaded with a canister of spent nuclear fuel, its weight does not exceed the crane's rated weight limit. Additionally, a transfer cask must still perform the important function of providing adequate radiation shielding for both the neutron and gamma radiation emitted by the enclosed spent nuclear fuel. As such, transfer casks are made of a gamma absorbing material such as lead and contain a neutron absorbing material.

However, the allowable weight of a transfer cask is limited by the lifting capacity of the plant's crane (or other lifting equipment). The load handled by the crane includes not only the weight of the transfer cask itself, but also the weight of the transfer cask's payload (i.e., the canister and its contents). A transfer cask must be designed so that the total load handled by the crane during all handling evolutions does not exceed the crane's rated weight limit, which is typically in the range of 100-125 tons.

Because the weight of the transfer cask's payload varies during the different stages of the transport procedure, the permissible weight of the transfer cask is equal to the rated capacity of the plant crane less the weight of the transfer cask's maximum payload at any lifting step. The weight of the transfer cask's payload is at a maximum when the transfer cask and canister are lifted out of the storage pool, at which time the canister is full of spent nuclear fuel and water. Thus, according to prior art methods, it is at this stage that the permissible weight of a transfer cask is calculated. The transfer cask is then constructed using this permissible weight as a design limitation.

Additionally, many nuclear sites have more than one reactor unit and more than one storage pool. Each of the storage pools might have its own crane, and the rated capacity of one crane at one storage pool might be different from the rated capacity of the crane at other storage pools. In nuclear sites with multiple pools and multiple cranes with different rating capacities, it might be desirable to move the depleted fuel assemblies from one pool, with a crane having a lower rating capacity, to another pool having a crane with a higher rating capacity, prior to placing the depleted fuel assemblies into a canister, such as a multi-purpose canister ("MPC") within a transfer cask. This is because the rated capacity of a crane at one pool might not be able to safely lift a fully loaded transfer cask (with depleted fuel assemblies and canister). Therefore, there is a need for a system and method of transferring the depleted fuel assemblies from one pool, having a crane that cannot safely lift a fully loaded transfer cask, to another pool, having a crane with a rating capacity that can safely lift a fully loaded transfer cask. Since the pools in some of these sites are not interconnected to permit underwater transfer of the depleted fuel assemblies from one pool to another, a transfer canister for inter-unit transfer of depleted fuel assemblies is needed. It is desirable that depleted fuel assembly transfer from one pool to another be accomplished in the minimum amount of time (and hence radiation dose), with multiple assemblies at one time, with minimized upending and downending operations that carry the risk of handling accidents, with minimized (or eliminated) reliance on forced cooling methods that may introduce operation vulnerability to the transfer process, ensuring no risk of a criticality event, and with maximized protection against events such as crane malfunctions.

Thus, a need exists for a method and apparatus for transferring high level radioactive materials from a first submerged environment to a second submerged environment that accomplishes the aforementioned goals.

SUMMARY OF THE INVENTION

The present invention is directed to a method and apparatus for transferring high level radioactive materials from a first pool to a second pool that uses the pool water to minimize the thermal shock to the high level radioactive waste payload, to provide neutron radiation shielding, and to extract the decay heat from the high level radioactive waste payload to keep them cool. In one embodiment, the high level radioactive waste payload is depleted fuel assemblies.

The present invention is also directed to a shielded transfer canister for inter-unit transfer of spent nuclear fuel assemblies with additional pressure relief volume that is isolated from canister's fuel storage cavity through one or more pressure relief devices, and a method incorporating the canister.

In one embodiment, the invention can be a method of transferring high level radioactive waste comprising: a) loading high level radioactive waste into a water-filled cavity of a canister body having an open top end at a first location; b) coupling a lid to the canister body to enclose the open top end; c) removing a volume of water from the cavity so that a water level of the water within the cavity is above a top end of the high level radioactive waste and a space exists between the water level and a bottom surface of the lid; d) hermetically sealing the cavity; and e) transferring the canister to a second location, the water level remaining above the top end of the high level radioactive waste during the transfer.

In an alternate embodiment, the invention can be a method of transferring spent nuclear fuel from a first body of water to a second body of water comprising: a) submerging a canister into the first body of water, the canister having a cavity having an open top end and a closed bottom end, the water filling the cavity; b) loading spent nuclear fuel into the cavity of the submerged canister; c) positioning a lid atop the loaded canister to enclose the open top end of the cavity; d) removing the loaded canister from the first body of water, the spent nuclear fuel remaining submerged in the water within the cavity; e) hermetically sealing the cavity; f) transferring and submerging the loaded canister to the second body of water; g) removing the lid from the loaded canister; and h) removing the spent nuclear fuel from the submerged canister.

In another alternate embodiment, the invention can be a canister apparatus for transferring spent nuclear fuel comprising: a tubular body forming a cavity for receiving spent nuclear fuel, the tubular body having a longitudinal axis, a floor enclosing a bottom end of the tubular body, an open top end; and a lid detachably coupled to the tubular body that encloses the open top end of the tubular body and hermetically seals the cavity, the lid comprising a chamber and a pressure relief device hermetically sealing an opening into the chamber, the pressure relief device automatically opening upon the pressure within the cavity exceeding a predetermined threshold so as to form a passageway from the cavity into the chamber.

These and various other advantages and features of novelty that characterize the invention are pointed out with particularity below. For a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION

Figure 1:
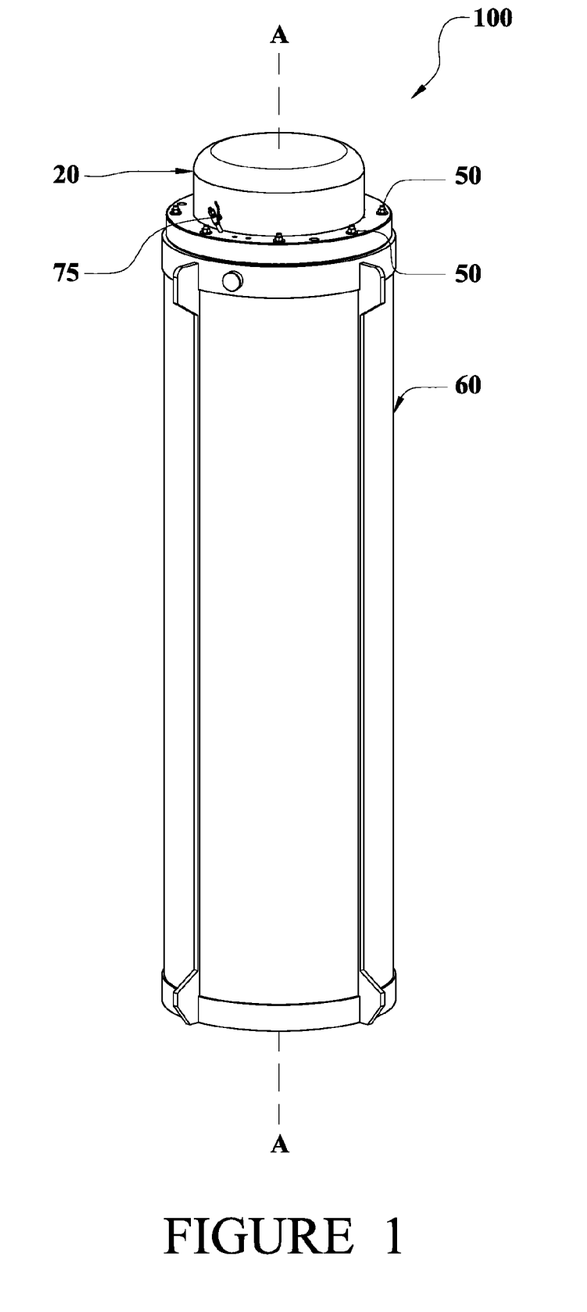
FIG. 1 is a perspective view of a transfer cask according to one embodiment of the present invention.
Figure 2:
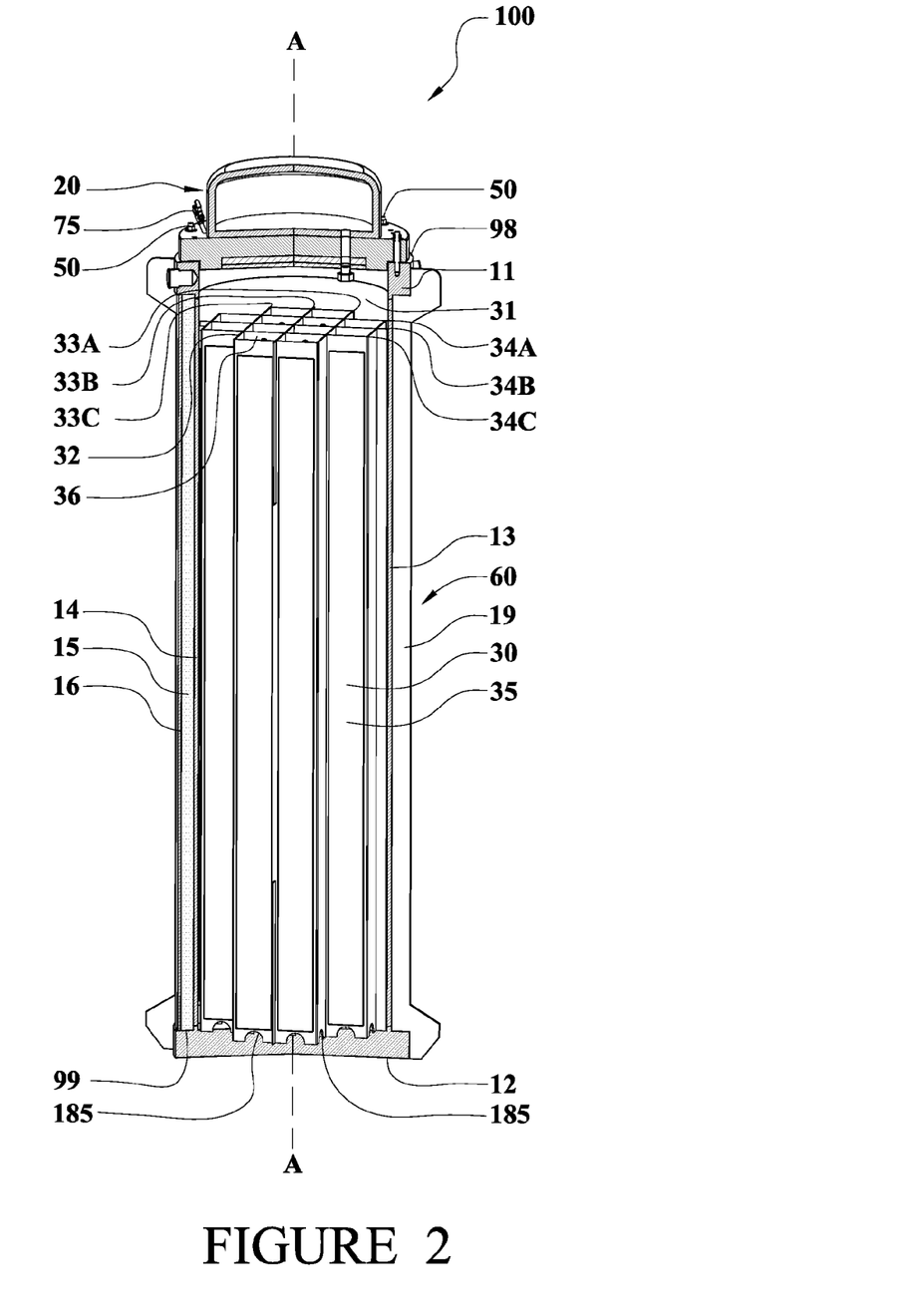
FIG. 2 is a longitudinal cross-sectional view of the transfer cask of FIG. 1 in partial cut-away along the A-A axis.

Referring to FIGS. 1 and 2 concurrently, the exterior of a shielded canister 100 is illustrated according to one embodiment of the present invention. The shielded canister 100 is a pressure vessel designed for use in a substantially vertical orientation, as depicted in FIG. 1. The shielded canister 100 is preferably a substantially cylindrical containment unit with a longitudinal axis A-A having a horizontal cross-sectional profile that is substantially circular in shape. It should be noted, however, that the invention is not limited to cylinders having circular horizontal cross sections but may also include containers having cross-sectional profiles that are, for example, rectangular, ovoid or other polygon forms. While the shielded canister 100 is particularly useful for use in conjunction with transporting spent nuclear fuel (SNF) assemblies, the invention is in no way limited by the type of high level radioactive materials to be transported in certain embodiments, unless specifically recited in the claims. The shielded canister 100 can be used to transport almost any type of high level radioactive materials (HLW). However, the shielded canister 100 is particularly suited for the transport and/or cooling of high level radioactive materials that have a residual heat load and produce neutron and gamma radiation, such as SNF.

As discussed in more detail below, the shielded canister 100 generally comprises a tubular body 60 and a removable lid 20. The tubular body 60 comprises a body portion 13, an upper structural ring 11, and a floor/base plate 12. The tubular body 60 is preferably tubular in shape and forms an internal storage cavity 31 for storing spent nuclear fuel assemblies. When fully assembled, the tubular body 60 forms a hermetically sealed fluid containment boundary about the storage cavity 31. In the exemplified embodiment, the body portion 13 of the tubular body 60 comprises three concentrically arranged tubular shells, namely an inner shell 14, an intermediate shell 15, and an outer shell 16. The body portion 13 of the tubular body 60 provides a desired level of gamma radiation shielding. If desired, the body portion 13 could further include layers to provide a level of neutron radiation shielding. Thus, the tubular body 60 may provide both gamma and neutron radiation shielding properties while at the same time facilitating improved cooling of the HLW stored inside the cavity by efficiently conducting heat away from the HLW. In an alternate embodiment, the body portion 13 of the tubular body 60 is formed with two concentrically arranged and spaced apart shells that comprise an annular gap in-between. The annular gap is then filled with a gamma radiation absorbing material such as lead. It is desired that the body portion 13 of the tubular body 60 be constructed so as to be efficient conductive path for thermal energy.

As noted above, the shielded canister 100 comprises the tubular body 60 and a removable lid 20. The tubular body 60 comprising a body portion 13, an upper structural ring 11, and a floor/base plate 12. Further, the tubular body 60 is preferably tubular in shape and forms an internal storage cavity 31 for storing spent nuclear fuel assemblies.

The floor/base plate 12 is hermetically sealed to a bottom end 99 of the body portion 13 of the tubular body 60. The floor/base plate 12 fully encloses and seals the bottom of the tubular body 60. Preferably, the floor/base plate 12 is welded to the bottom of the body portion 13 of the tubular body 60, thereby hermetically sealing the bottom end of the cavity 31.

The floor/base plate 12 functions as the floor of the cavity 31 of the shielded canister 100 and preferably has a flat bottom for stability.

The upper structural ring 11 is connected to the top of the body portion 13 of the tubular body 60 and forms an open top end 98 of the tubular body 60. The upper structural ring 11 comprises an opening and is concentric with the body portion 13 of the tubular body 60, thereby forming a passageway into an open top end of the cavity 31. Preferably, the upper structural ring 11 is welded to the top edge of the body portion 13 of the tubular body 60. It is also preferred that the opening in the upper structural ring 11 be the same diameter as the internal storage cavity 31 of the shielded canister 100. In the preferred embodiment the floor/base plate 12 and top structural ring 11 are hermetically sealed to the inner and outer shells 14, 16 of the body portion 13 of the tubular body 60.

As discussed in more detail below, the removable lid 20 is configured so that it may be detachably coupled to the top end 98 of the tubular body 60 in a manner that hermetically seals the open top end 98 of the tubular body 60. One or more annular gaskets may be used at the interface between the lid 20 and the tubular body 60. In the exemplified embodiment, the removable lid 20 is sealed to the structural ring 11 using bolts 50. The removable lid 20 is designed to rest atop and be removable/detachable from the top structural ring 11 of the tubular body 60. When the removable lid 20 is bolted to the top structural ring 11 of the tubular body 60, the removable lid forms a hermetic seal with the tubular body 60 of the shielded canister 100. In the preferred embodiment, both the floor/base plate 12 and the structural ring 11 are thick steel forgings.

The tubular body 60 forms an internal storage cavity 31 for receiving and storing the SNF assemblies, which can still give off considerable amounts of heat. The cavity 31 is a cylindrical cavity having an axis that is in a substantially vertical orientation. The invention is not so limited however, and the axis could be in a substantially horizontal orientation or another orientation. The horizontal cross-sectional profile of the cavity 31 is generally circular in shape, but is dependent on the shape of the inner shell 14 of the tubular body 60, which is not limited to circular. The top end of the cavity 31 is open, providing access to the cavity 31 from outside of the shielded canister 100 (the removable lid 20 provides closure to the top end of the cavity 31 when secured to the shielded canister 100). The bottom end of the cavity 31 is closed by the floor/base plate 12. More specifically, the top surface of the floor/base plate 12 acts as a floor for the cavity 31.

The shielded canister 100 forms a containment boundary about the storage cavity 31 (and thus the stored SNF assemblies). The containment boundary can be literalized in many ways, including without limitation a gas-tight containment boundary, a pressure vessel, a hermetic containment boundary, a radiological containment boundary, and a containment boundary for fluidic and particulate matter. These terms are used synonymously throughout this application. In one instance, these terms generally refer to a type of boundary that surrounds a space and prohibits all fluidic and particulate matter from escaping from and/or entering into the space when subjected to the required operating conditions, such as pressures, temperatures, etc.

Referring to FIG. 2, the internal components making up the body portion 13 of the tubular body 60 of the shielded canister 100 according to one embodiment of the present invention are illustrated. As noted above, in the exemplified embodiment, the body portion 13 of the tubular body 60 comprises the inner shell 14, the intermediate shell 15 and the outer shell 16. In the preferred embodiment, the tubular body 60 is made as thick as possible within the constraints of the lifting equipment's capacity. The maximized weight enhances shielding protection and imparts a greater thermal inertia to the shielded canister 100, making the temperature rise more gradual as the shielded canister 100 is lifted out of a pool and carried in open air.

The inner shell 14 comprises an inner surface 97 and an outer surface 96, and is the innermost shell of the body portion of the tubular body 60. As a result, the inner surface 97 of the inner shell 14 forms the walls of the cavity 31 in which the spent nuclear fuel assemblies are placed and held for storage and/or transport. The inner shell 14 forms the initial boundary separating the spent nuclear fuel from the external environment. Accordingly, the inner shell 14 is preferably made of a high strength steel such as, for example, SA 203 E and is preferably sufficiently thick to account for the known degradations in molecular structure from long-term exposure to neutron and gamma rays. Steel is also a preferred material to use for the inner shell 14 due to its good thermal conductivity, which is important for providing a path for the decay heat generated by the contained radioactive material to pass through (and ultimately be dissipated into the environment). Finally, steel is also preferred due to its high melting point, which ensures that the integrity of the inner shell 14 is not compromised even at high temperatures.

The intermediate shell 15 comprises an inner surface 95 and an outer surface 94, and is concentrically arranged to circumferentially surround an outer surface 96 of the inner shell 14. In the preferred embodiment, the inner surface 95 of the intermediate shell 15 is concentric to and in contact with the outer surface 96 of the inner shell 14. Therefore, the intermediate shell 15 is both concentric to and coaxial with the inner shell 14. In the preferred embodiment, the intermediate shell 15 is formed of lead, however in alternate embodiments the intermediate shell 15 may be formed of steel or another good conductor of heat that also acts a gamma radiation absorber.

The outer shell 16 comprises an inner surface 93 and an outer surface 92, and circumferentially surrounds an outer surface 94 of the intermediate shell 15. The outer shell 16 is both concentric to and coaxial with the inner shell 14 and the intermediate shell 15. The outer surface 92 of the outer shell 16 comprises the outer surface of the tubular body 60 of the shielded canister 100. In the exemplified embodiment, the outer shell 16 is formed of steel, however in alternate embodiments the outer shell 16 may be formed of lead, another metal or a metal alloy.

In the exemplified embodiment, the outside surface 92 of the outer shell 16 of the tubular body 60 comprises extended surfaces 19 that extend radially from the tubular body 60 to enhance the heat dissipation to the shielded canister 100. Preferably, the extended surfaces 19 are fins or dimples. The extended surfaces 19 minimize the heat-up rate of water within the shielded canister 100 through the use of convection.

The term "concentric" as used herein is not limited to an arrangement wherein the shells 14, 15, 16 are coaxial, but includes arrangements wherein the shells 14, 15, 16 may be offset. Furthermore, the term "annular," as used herein, is not limited to a circular shape and does not require that the object or space have a constant width. For example, the inner shell 14 may have a circular transverse cross-section while the intermediate shell 15 may have a rectangular transverse cross-section.

Any of the shells may be formed by bending a rectangular plate into a cylinder or other shape and welding together the two meeting ends, welding a series of elongated rectangular plates together end-to-end, or by any other method known to those skilled in the art to produce the desired shape. A machining process may also be used.

Referring still to FIG. 2, a longitudinal cross-sectional view of the shielded canister 100 in partial cut-away along line A-A of FIG. 1 is illustrated according to one embodiment of the present invention. From this perspective, the outer shell 16, the intermediate shell 15 and the inner shell 14 are seen oriented along axis A-A and extending from the floor/base plate 12 to the upper structural ring 11 of the shielded canister 100. It is preferred that the upper structural ring 11 and the floor/base plate 12 are made of carbon steel and are each welded to the respective ends of the inner shell 14 and outer shell 16. As discussed in more detail below, once the cavity 31 of the inner shell 14 is loaded from the top, the removable lid 20 may be installed over to seal the opening of the structural ring 11.

In the preferred embodiment, inside the cavity 31 is an upright fuel basket 30 with multiple fuel storage cavities 36 for receiving spent nuclear fuel assemblies (not shown). An example of a basket assembly is disclosed in U.S. Pat. No. 5,898,747 (Singh), issued Apr. 27, 1999, the entirety of which is hereby incorporated by reference. The invention, however, is not limited to the use of any specific canister structure.

The basket 30 is formed from a honeycomb gridwork 32 of plates 33a-33c and 34a-34c having neutron absorber material 35 positioned in areas which form walls of storage cells formed by the honeycomb structure. The honeycomb structure of fuel basket 30 results in vertical cells 36 (also called "fuel cavities" or "storage cells"), each one of which is designed to hold one spent nuclear fuel assembly. The storage cells 36 are preferably created by arranging a gridwork of plates in a rectilinear arrangement. The basket 30 is formed from an array of plates 33a-33c and 34a-34c welded to each other, such as to form a honeycomb structure. Of course, slotted connection can be sued. In the exemplified embodiment, the height of the fuel basket 30 is less than the height of the cavity 31 of the shielded canister 100 so as to allow room for a top plenum of water and/or vapor as discussed below. In alternate embodiments, the number of plates or storage cells may differ, and/or the basket 30 may employ sleeves or boxes within the storage cells.

The fuel basket 30 is configured to facilitate a natural thermosiphon flow of fluid within the hermetically sealed cavity 31 when the spent nuclear fuel assemblies are loaded within the cavity 31 and giving off a heat load. When SNF is loaded into storage cells 36 of the shielded canister 100, the heat emanating from the SNF conducts into the fluid of the cavity 31 that is contact with the SNF. The warmed fluid (which as discussed below is preferably pool water) rises within the cells 36 and into a top plenum of fluid. As the heated fluid comes into contact with the walls of the cavity 31, the heat is conducted radially outward through the tubular body 60 and the lid 20. As a result of this cooling, the fluid adjacent the walls flows downward through downcomer passageways (which can be empty fuel cells). This downwardly flowing cooled fluid flows to the bottom of the cavity 31. A plurality of openings 185 are provided at the bottom end of the basket 30. The openings 185 form passageways between the all of the cells 36 and the downcomer passageways, thereby creating a bottom plenum. Once the cooled fluid flows into the bottom plenum, it is redistributed back in the cells 36 loaded with the SNF where it is heated and rises, thereby completing a thermosiphon cycle.

In one embodiment, the top plenum may be formed by that volume of fluid located above a top edge of the basket 30 and below a fluid level. The existence of the top plenum allows for radially outward fluid flow. The bottom plenum allows radially inward fluid flow.

Figure 3:
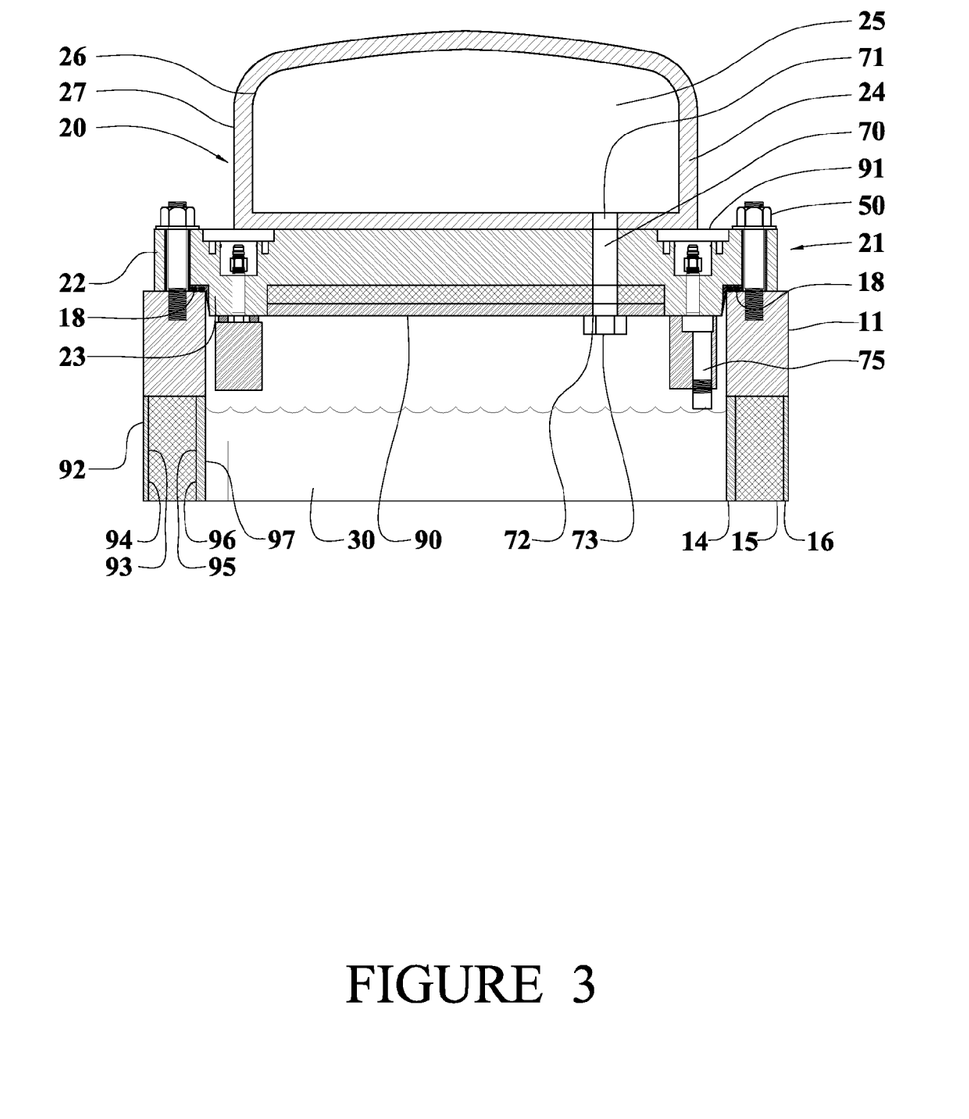
FIG. 3 is a perspective view of a lid according to one embodiment of the present invention.

Referring now to FIG. 3, an embodiment of the removable lid 20 of the shielded canister 100 of the present invention is illustrated. In the preferred embodiment, the removable lid 20 is a non-unitary structure relative to the tubular body 60. The lid 20, in the exemplified embodiment, is detachably coupled by bolts 50 to the upper structural ring 11 of the tubular body 60. The removable lid 20 rests atop and is supported by the upper structural ring 11, which rests atop and is secured to the top edges of the inner, intermediate, and outer shells 14, 15, 16 of the tubular body 60. The removable lid 20 encloses the top of the cavity 31 and provides the necessary radiation shielding so that radiation can not escape from the top of the cavity 31 when the canister is loaded with HLW stored therein. The removable lid 20 is specially designed to hermetically seal the open top end of the shielded canister 100 when properly installed. In one embodiment, the lid 20 is formed as a multi-layered construct of lead and steel. It should be noted that in alternate embodiments, the removable lid 20 may be detachably coupled to the shielded canister 100 through other means.

The components of the removable lid 20 according to one embodiment of the present invention will be discussed. In the exemplified embodiment, the removable lid 20 comprises a body portion 21 and a dome portion 24. The body portion 21 of the removable lid 20 comprises a flange portion 22 and a plug portion 23. Further, the body portion 21 has a top surface 91 and a bottom surface 90. When the removable lid 20 is positioned atop the tubular body 60, the bottom surface 90 of the body portion 21 of the lid 20 forms a roof of the cavity 31. The plug portion 22 extends downward from the bottom of the flange portion 22. The flange portion 22 surrounds the plug portion 23, extending therefrom in a radial direction. The dome portion 24 is attached to the top surface 91 of the body portion 21. The dome portion 24 extends upward from the top surface 91 of the body portion 21 in the shape of a dome and forms an internal chamber 25 therein. In alternate embodiments, the dome portion 24 can be any shape or size that is desired. In one embodiment, the body portion 21 of the removable lid 20 can be formed of both neutron and/or gamma radiation absorbing materials, including neutron absorbing plates such as lead.

The cooperational relationship of the elements of the removable lid 20 and the elements of the tubular body 60 will now be described. When the removable lid 20 is properly positioned atop the tubular body 60 of the shielded canister 100, the plug portion 23 of the removable lid 20 extends into the cavity 31 until the flange portion 22 of the removable lid 20 contacts and rests atop the upper structural ring 11. The flange portion 22 eliminates the danger of the removable lid 20 falling into the cavity 31.

When the removable lid 20 is positioned atop the upper structural ring 11, one or more gasket seals 18 are compressed between the flange portion 22 of the removable lid 20 and the top end 98 of the tubular body 60, thereby forming a hermetically sealed interface. The gasket seal 18 provides a positive seal at the lid/body interface, hermetically sealing the shielded canister 100. Once the removable lid 20 is positioned atop the upper structural ring 11 of the shielded canister 100, the removable lid 20 is secured to the upper structural ring 11 with bolts 50. In alternate embodiments, the removable lid 20 may be secured to the upper structural ring 11 through other connecting means.

The dome portion 24 comprises an inner surface 26, an outer surface 27, and a resulting dome chamber 25. The bottom portion of the outer surface 27 of the dome portion 24 is secured to the top surface 91 of the body portion 21 of the removable lid 20. The dome chamber 25 is formed by a cavity created by the inner surface 26 of the dome portion 24. As discussed in more detail below, the dome chamber 25 may be formed having a vacuum pressure therein to provide additional volume to relieve excess pressure that may accumulate in the cavity 31 of the shielded canister 100 when the removable lid 20 is hermetically sealed atop the shielded canister 100.

The removable lid 20 further comprises a first passageway 70 that extends from the dome chamber 25 through the flange portion 22 and plug portion 23, and into the cavity 31 of the shielded canister 100. The first passageway 70 extends from an opening 71 in the bottom of the dome chamber 25 to an opening 72 in the bottom surface 90 of the body portion 21 of the lid 20, thereby forming a passageway from the cavity 31 to the chamber 25. A pressure relief device 73 is operably coupled to the opening 72 in the bottom surface 90 of the body portion 21 of the removable lid 20 and hermetically seals the first passageway 70. The pressure relief device 73 extends from at least part way in the first passageway 70 into the cavity 31 of the shielded canister 100 in the exemplified embodiment. In the preferred embodiment, the pressure relief device 73 is made of a ductile and thermally conductive material, such as steel or lead, or a combination thereof. As discussed in more detail below, the pressure relief device 73 is configure to open the first passageway 70 when the pressure inside the cavity 31 exceeds a threshold value, and thereby reduce the pressure inside the cavity 31 of the shielded canister 100 by opening the first passageway 70 between the cavity 31 and the dome chamber 25 of the removable lid 20. The pressure relief device 73 may be a pressure relief valve, a rupture disk, or other devices as are know in the art. In alternate embodiments, the first passageway 70 may be a tortuous passageway so no direct line of sight exists between the cavity 31 of the shielded canister 100 and the chamber of the dome portion 23 of the removable lid 20.

The removable lid 20 further comprises a valve port 75 for adjusting the water level within the cavity 31 of the shielded canister 100. The valve port 75 comprises a port that extends through a second passageway (not shown) and is operably coupled to a valve on the outside of the shielded canister 100. In the preferred embodiment, a second passageway extends from a second opening (not shown) in the bottom of the plug portion 23 of the removable lid 20 to an opening (not shown) in the top surface 91 of the body portion 21 of the removable lid 20. The valve port 75 preferably extends from inside the cavity 31 of the shielded canister 100, through the second passageway, and out of the opening in the top surface 91 of the body portion 21. Preferably, the valve port can be adjusted between a closed position where the cavity 31 remains hermetically sealed, and an open position where the hermetic seal is alleviated so that the valve port can be sued to introduce or expel a fluid into or out of the cavity 31. In the preferred embodiment, the valve port 75 extends into the cavity 31 to a point above the top of the basket assembly 30 located within the cavity 31. Thus, the valve port is capable of reducing the water level within the cavity 31 of the shielded canister 100 to a level slightly above the top of the basket assembly by pumping out the excess water. Keeping the water level above the basket assembly 30 allows for proper thermosiphon flow of the water to aid in cooling the spent nuclear fuel assemblies residing within the basket assembly 30. Further, in alternate embodiments, the valve port, 75 is configured to backfill the cavity 31 of the shielded canister 100 with a gas, preferably steam, to alter the internal pressure of the shielded canister 100 and to maintain a space as the volume of liquid water may expand due to the thermal heating.

Next, the preferred method of the present invention will be described in detail. Many nuclear plant sites have more than one reactor unit and more than one fuel pool. At such plants, it may be necessary to have the means to transfer the spent nuclear fuel assemblies from one pool to another by moving them out of the fuel building of one unit and into another through the recipient building's truck bay. One method of carrying out such a transfer in accordance with the present invention will be described below.

At an initial step, the tubular body 60 (with the lid 20 removed) is lifted with a first crane in the first building and is lowered and submerged in a first storage body of water (pool) at a nuclear site. Specifically, the first storage pool may have a crane with a limited rated lifting capacity, and particularly with a lifting capacity that is not rated for the removal of a fully loaded transfer cask from a submerged state within the first pool. Once the tubular body 60 is submerged in the first pool, the pool water automatically fills the cavity 31. Spent nuclear fuel assemblies are then loaded into the basket 30 of the tubular body 60 while the tubular body 60 and spent nuclear fuel assemblies remain submerged in the first fuel pool. Specifically, the spent nuclear fuel assemblies are loaded into the cells 36 of the cavity 31 via the open top end 98 of the tubular body 60. Thereafter, the removable lid 20 is coupled atop the tubular body 60 to enclose the open top end 98 while the shielded canister 100 remains submerged underwater in the pool. Next, the first crane lifts the shielded canister 100 from the pool and into a staging area. Once at the staging area, the removable lid 20 is secured to the tubular body 60, thereby forming a pressure vessel in which the spent nuclear fuel assemblies and the water are contained assuming the valve port 75 is in the closed position).

In alternate embodiments, an intermediate lid may be placed atop the shielded canister 100 prior to removing it from the pool. In such embodiments, once outside of the pool and in the staging area, the intermediate lid is removed and the removable lid 20 is hermetically sealed to the shielded canister 100. After the shielded canister 100, with removable lid 20 hermetically attached, is removed from the pool, the shielded canister 100 is transferred to a second pool.

In one embodiment, once removed from the first pool, a portion of the water from the cavity 31 of the shielded canister 100 is removed using the valve port 75 so that the water level within the cavity 31 is above the top of the fuel basket 30 (and HLW) and a space exists between the water level and the bottom surface 90 of the lid. Controlling the water level so that it is above the top of the baskets ensures proper thermosiphon flow to aid in cooling the spent nuclear fuel assemblies while they are inside the hermetically sealed shielded canister 100. It should be noted that the removal of the water from the cavity 31 may be done before or after the removable lid 20 is hermetically sealed atop the shielded canister 100. After the water level within the cavity 31 is adjusted to be at the desired level, the valve of the valve port 75 is closed, thereby hermetically sealing the shielded canister 100.

In one embodiment, the space formed above the water level and the bottom surface of the lid 20 may be backfilled with a gas via the valve port 75, preferably steam, to alter the internal pressure of the shielded canister 100. After backfilling the cavity with a gas, the valve of the valve port 75 is closed and the cavity 31 is hermetically sealed.

During transfer from the first pool to the second pool, the shielded canister 100, and specifically the removable lid 20 provide for the safe transfer of the spent nuclear fuel assemblies. Preferably, the water level remains above the top of the fuel baskets 30 during transfer to the second pool. Due to the limited lifting capacity of the first crane, a transfer cask (weighing in the upwards of 100-125 tons) could not be used. To counteract the reduced material and weight of the shielded canister 100, and yet still provide sufficient neutron and gamma radiation protection, the shielded canister 100 contains water within cavity 31 during the transfer from the first pool to the second pool. In order to ensure that the water within the cavity 31 does not reach a boiling point, the shielded canister 100 is hermetically sealed with the removable lid 20 that comprises the pressure relief device 73. The removable lid 20, the pressure relief device 73 and the dome chamber 25 aid in preventing the water within cavity 31 from reaching a boiling point. To do so, the pressure relief device 73 is configured to automatically open the passageway 70 between the cavity 31 and the dome chamber 25 upon the equilibrium pressure within the cavity 31 reaching a threshold potential. If the equilibrium pressure within the cavity 31 does reach and/or exceed the threshold potential, the pressure relief device 73 automatically opens the passageway 70 thereby increasing the overall volume and reducing the resulting pressure, while maintaining the hermetic seal within the shielded canister 100.

Upon arriving at the second pool, the shielded canister 100 is lowered into the pool through the use of a second crane. Preferably, the second crane has a rated lifting capacity that exceeds the weight of a fully loaded transfer cask. Once in the second pool, the spent nuclear fuel assemblies located within the basket of the shielded canister 100 are removed and preferably placed into a second canister that is located within a transfer cask. Thereafter, the shielded canister 100 is removed from the pool.

While the invention has been described and illustrated in sufficient detail that those skilled in this art can readily make and use it, various alternatives, modifications, and improvements should become readily apparent without departing from the spirit and scope of the invention.

What is claimed is:

1. A method of transferring high level radioactive waste comprising:
    a) loading high level radioactive waste into a water-filled cavity of a canister body having an open top end at a first location;
    b) coupling a lid to the canister body to enclose the open top end;
    c) removing a volume of water from the cavity so that a water level of the water within the cavity is above a top end of the high level radioactive waste and a space exists between the water level and a bottom surface of the lid;
    d) hermetically sealing the cavity; and
    e) transferring the canister to a second location, the water level remaining above the top end of the high level radioactive waste during the transfer.

2. The method of claim 1 wherein the first location is a submerged environment and the second location is a submerged environment.

3. The method of claim 2 wherein the first location is a first pool and the second environment is a second pool.

4. The method of claim 1 wherein the water in the cavity is the water from the first pool.

5. The method of claim 1 wherein step c) comprises backfilling the space with a gas to pressurize the space.

6. The method of claim 5 therein the gas is steam.

7. The method of claim 1 wherein the lid comprises a chamber and a pressure relief device hermetically sealing an opening into the chamber, and wherein step e) further comprises upon the pressure within the cavity exceeding a predetermined threshold, the pressure relief device automatically opening so as to firm a passageway from the cavity into the chamber, thereby relieving, pressure within the cavity.

8. The method of claim 1 wherein the canister body is thermally conductive.

9. The method of claim 8 wherein the canister body is constructed of lead and steel.

10. The method of claim 1 further comprising a fuel basket located within the cavity, the fuel basket comprising a gridwork of plates forming a plurality of axially extending cells.

11. The method of claim 10 wherein step c) comprises a bottom plenum of water being formed at a bottom end of the cavity, a top plenum of water being formed below the water level, and one or more downcomer passageways adjacent an inner surface of the cavity that extend between the top plenum and the bottom plenum, and wherein during step e), thermosiphon flow of the water occurs within the cavity.

12. A method of transferring spent nuclear fuel from a first body of water to a second body of water comprising:
    a) submerging a canister into the first body of water, the canister having a cavity having, an open top end and a closed bottom end, the water filling the cavity;
    b) loading spent nuclear fuel into the cavity of the submerged canister:
    c) positioning a lid atop the loaded canister to enclose the open top end of the cavity;
    d) removing the loaded canister from the first body of water, the spent nuclear fuel remaining submerged in the water within the cavity;
    e) hermetically sealing the cavity;
    f) transferring and submerging the loaded canister to the second body of water;
    g) removing the lid from the loaded canister; and
    h) removing the spent nuclear fuel from the submerged canister.

13. The method of claim 12 wherein step d) further comprises draining a portion of the water from the cavity so that the spent nuclear fuel remains submerged in the water and a portion of the cavity is free of the water.

14. The method of claim 12 wherein step d) further comprises backfilling the portion of the cavity that is free of the water with steam and hermetically sealing the cavity.

15. The method of claim 12 wherein the lid comprises a chamber and a pressure relief device hermetically sealing an opening into the chamber, and wherein step f) further comprises upon the pressure within the cavity exceeding a predetermined threshold, the pressure relief device automatically opening so as to form a passageway from the cavity into the chamber, thereby relieving pressure within the cavity.

16. The method of claim 12 wherein the canister body is thermally conductive.

17. The method of claim 12 further comprising a fuel basket located within the cavity, the fuel basket comprising a gridwork of plates forming a plurality of axially extending cells, and wherein step b) comprises loading the spent nuclear fuel into the cells.

18. The method of claim 17 wherein step d) further comprises draining a portion of the water from the cavity so that the spent nuclear fuel remains submerged in the water and a portion of the cavity is free of the water, a bottom plenum of water being formed at a bottom end of the cavity, a top plenum of water being formed below a water level, and one or more downcomer passageways being formed adjacent an inner surface of the cavity that extend between the top plenum and the bottom plenum, and wherein during, step 5), a thermosiphon flow of the water occurs within the cavity.

19. A canister apparatus for transferring spent nuclear fuel comprising:
- a tubular body forming a cavity for receiving spent nuclear fuel, the tubular body having a longitudinal axis, a floor enclosing a bottom end of the tubular body, an open top end;
- a lid detachably coupled to the tubular body that encloses the open top end of the tubular body and hermetically seals the cavity, the lid comprising a chamber and a pressure relief device hermetically sealing an opening into the chamber, the pressure relief device automatically opening upon the pressure within the cavity exceeding a predetermined threshold so as to form a passageway from the cavity into the chamber; and
- wherein the cavity, the passageway, and the chamber collectively form a hermetically sealed volume when the pressure relief device is open.

20. The canister apparatus of claim 19 wherein the lid comprises: a body portion having a bottom surface and a top surface, the bottom surface of the body portion of the lid forming a roof of the cavity; and a dome portion attached to the top surface of the body portion, the dome portion forming the chamber.

21. The canister apparatus of claim 20 wherein the opening extends from the bottom surface of the body portion of the lid into the chamber, the pressure relief device coupled to the body portion of the lid.

22. The canister apparatus of claim 20 wherein the body portion of the lid and the tubular body are multi-layered constructs of lead and steel.

23. The canister apparatus of claim 20 wherein the body portion of the lid comprises a plug portion that extends into the cavity and a flange portion that forms a lid-to-body interface with a top edge of the tubular body.

24. The canister apparatus of claim 20 wherein the body portion of the lid further comprises a valved port for adjusting a water level within the cavity.

25. The canister apparatus of claim 19 wherein the chamber has a vacuum pressure.

26. The canister apparatus of claim 19 further comprising a fuel basket located within the cavity, the fuel basket comprising a gridwork of plates forming a plurality of axially extending cells.

27. The canister apparatus of claim 26 wherein the fuel basket is configured to facilitate a thermosiphon flow of fluid within the hermetically sealed cavity when spent nuclear fuel having a heat load is loaded in the cavity.

28. The canister apparatus of claim 26 wherein the fuel basket has a height that is less than a height of the hermetically sealed cavity.

29. The canister apparatus of claim 19 wherein the tubular body is thermally conductive.

30. The canister apparatus of claim 19 wherein the pressure relief device is a pressure relief valve or a rupture disk.

* * * * *